(12) United States Patent
Woestemeyer et al.

(10) Patent No.: US 7,877,311 B1
(45) Date of Patent: Jan. 25, 2011

(54) SYSTEM AND METHOD FOR ANALYZING TRANSACTIONS AT AN ELECTRONIC EXCHANGE

(75) Inventors: Ronald F. Woestemeyer, Houston, TX (US); Matthew Johnson, Houston, TX (US); Theodore V. Valkov, Bellaire, TX (US); Marc Paige, Houston, TX (US); Mikael O. Weigelt, Kingwood, TX (US); Nicola Secomandi, Houston, TX (US)

(73) Assignee: PROS Revenue Management, Inc., Houston, TX (US)

( * ) Notice: Subject to any disclaimer, the term of this patent is extended or adjusted under 35 U.S.C. 154(b) by 1556 days.

(21) Appl. No.: 09/919,385

(22) Filed: Jul. 31, 2001

Related U.S. Application Data

(60) Provisional application No. 60/222,534, filed on Aug. 2, 2000.

(51) Int. Cl.
*G06Q 40/00* (2006.01)

(52) U.S. Cl. .......................................... 705/37; 705/10

(58) Field of Classification Search ................... 705/37, 705/14.4, 35
See application file for complete search history.

(56) References Cited

U.S. PATENT DOCUMENTS 5,974,396 A * 10/1999 Anderson et al. ............. 705/10
6,334,110 B1 * 12/2001 Walter et al. .................. 705/14

OTHER PUBLICATIONS

PR Newswire. "net.Genesis Announces Most Valuable Customer™ Segmentation Package." New York: Mar. 22, 1999. p. 1; 3 pages.*

* cited by examiner

*Primary Examiner*—Ojo O Oyebisi
(74) *Attorney, Agent, or Firm*—Crowell & Moring LLP

(57) ABSTRACT

The present invention can provide a market analysis system which includes a computer processor, a computer readable storage medium, a database stored on the computer readable storage medium including a set of transaction data and a software program stored on the computer readable storage medium. The software program can be executable by the computer processor to receive a transaction from an electronic exchange, store the transaction in the database as an addition to the set of transaction data, define a standard pricing group from the set of transaction data, and apply a statistical analysis to the standard pricing group.

22 Claims, 5 Drawing Sheets

SYSTEM AND METHOD FOR ANALYZING TRANSACTIONS AT AN ELECTRONIC EXCHANGE

RELATED INFORMATION

This application claims priority under 35 U.S.C. §119(e) to provisional application Ser. No. 60/222,534, filed Aug. 2, 2000 entitled "System and Method for Analyzing Transactions in an Electronic Exchange," which is hereby fully incorporated by reference.

TECHNICAL FIELD OF THE INVENTION

The present invention relates generally to systems for analyzing transactions, and more particularly, to a system and method for analyzing transactions in an electronic exchange.

BACKGROUND OF THE INVENTION

For thousands of years, marketplaces have provided a convenient forum for merchants and customers carry out trade. A modern marketplace, whether it is a bazaar in Turkey or a suburban shopping mall, still serves the basic function of bringing suppliers and purchasers together at one location. With the advent of the Internet and other communications technologies, it is no longer necessary for suppliers and purchasers to appear at the same physical location to carry out market transactions. Instead, it is becoming increasingly popular for purchasers and suppliers to conduct transactions via electronic exchanges. Examples of these electronic exchanges abound and include web sites such as auction sites, retail sales sites and so on. At electronic exchanges, a large number of purchasers can typically buy products from a number of competing suppliers and suppliers can receive purchase orders or bids for their products from a large number of potential purchasers, making electronic exchanges efficient for both suppliers and purchasers. Furthermore electronic exchanges can be convenient for both suppliers and purchasers because electronic exchanges provide a user-friendly forum at which to conduct transactions, and electronic exchanges are not typically subject to many of the constraints that limit traditional "brick and mortar" market forums, such as only being able to operate during regular business hours.

From a supplier's perspective, the efficiency and value of a particular market forum depends on the amount of information the supplier has about the transactions that occur at the forum. If the supplier has sufficient information, the supplier can attempt to maximize profits by applying revenue management techniques. By analyzing the transactions that occur at a market forum, the supplier can determine at which price to sell an item or service in order to garner the most profit. Current systems of analyzing transactions at electronic exchanges, however, only provide information to a supplier regarding the transaction in which that supplier participated. In such prior systems, each supplier would only see his own transactions and is not aware of the details of the competition. Thus, a supplier that employs current systems for analyzing transactions at electronic exchanges only has information about transactions in which that supplier participated and has limited information about the market as whole. Additionally, prior systems do not provide a scientific means to summarize the transactions such that they can be used for revenue management purposes. Because the supplier lacks meaningful revenue management information about the market as a whole, the supplier can not make fully informed pricing decisions, thus hindering the market efficiency of the electronic exchange.

SUMMARY OF THE INVENTION

The present invention provides a system and method for analyzing transactions at an electronic exchange that substantially eliminates or reduces disadvantages and problems associated with previously developed market analysis systems. More particularly the present invention can provide a market analysis system which includes a computer processor, a computer readable storage medium, a database stored on the computer readable storage medium including a set of transaction data and a software program stored on the computer readable storage medium. The software program can be executable by the computer processor to receive a transaction from an electronic exchange, store the transaction in the database as an addition to the set of transaction data, define a standard pricing group from the set of transaction data, and apply a statistical analysis to the standard pricing group.

The present invention provides a substantial advantage over previously developed systems for analyzing transactions in electronic exchanges by providing market level information to suppliers.

The present invention provides another important technical advantage over previously developed systems for analyzing transactions in electronic exchanges by facilitating the application of revenue management techniques.

The present invention provides yet another important technical advantage over previously developed systems for analyzing transactions at electronic exchanges by extracting characteristic measures of customer demands for products and services.

The present invention provides yet another important technical advantage over previously developed systems for analyzing transactions in electronic exchanges by facilitating buying and/or selling decisions.

The present invention provides yet another important technical advantage over previously developed systems for analyzing transactions in electronic exchanges by providing comparisons of a supplier's performance as compared to that of the market as a whole.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Electronic exchanges use computer systems to facilitate market transactions between purchasers of products and services and suppliers of those products and services. An example of such an electronic exchange could be an auction web site at which potential purchasers make bids for products. One advantage of having such a web site is that a large number of potential purchasers could submit bids to any number of suppliers via an easily accessible medium (e.g., the Internet). Because a great number of transactions can occur at the web site, a large amount of market transaction information can be accumulated at the site.

As with other market forums, many factors can affect the price of products or services at electronic exchanges. These factors can relate to the buyer or the seller, the timing of a transaction, the delivery channel of the product or service and/or the product or service itself. Furthermore, even in the same market, these factors can change from season to season, location to location, industry to industry, product to product, and so on. Thus, in order to fully understand a market and to make informed pricing decisions, suppliers must be able to analyze the transactions that occur in a market. The present invention provides a system for analyzing the transactions that occur at an electronic exchange. Because the present invention can analyze transactions at the market level, the present invention can facilitate buying and selling decisions.

Figure 1:
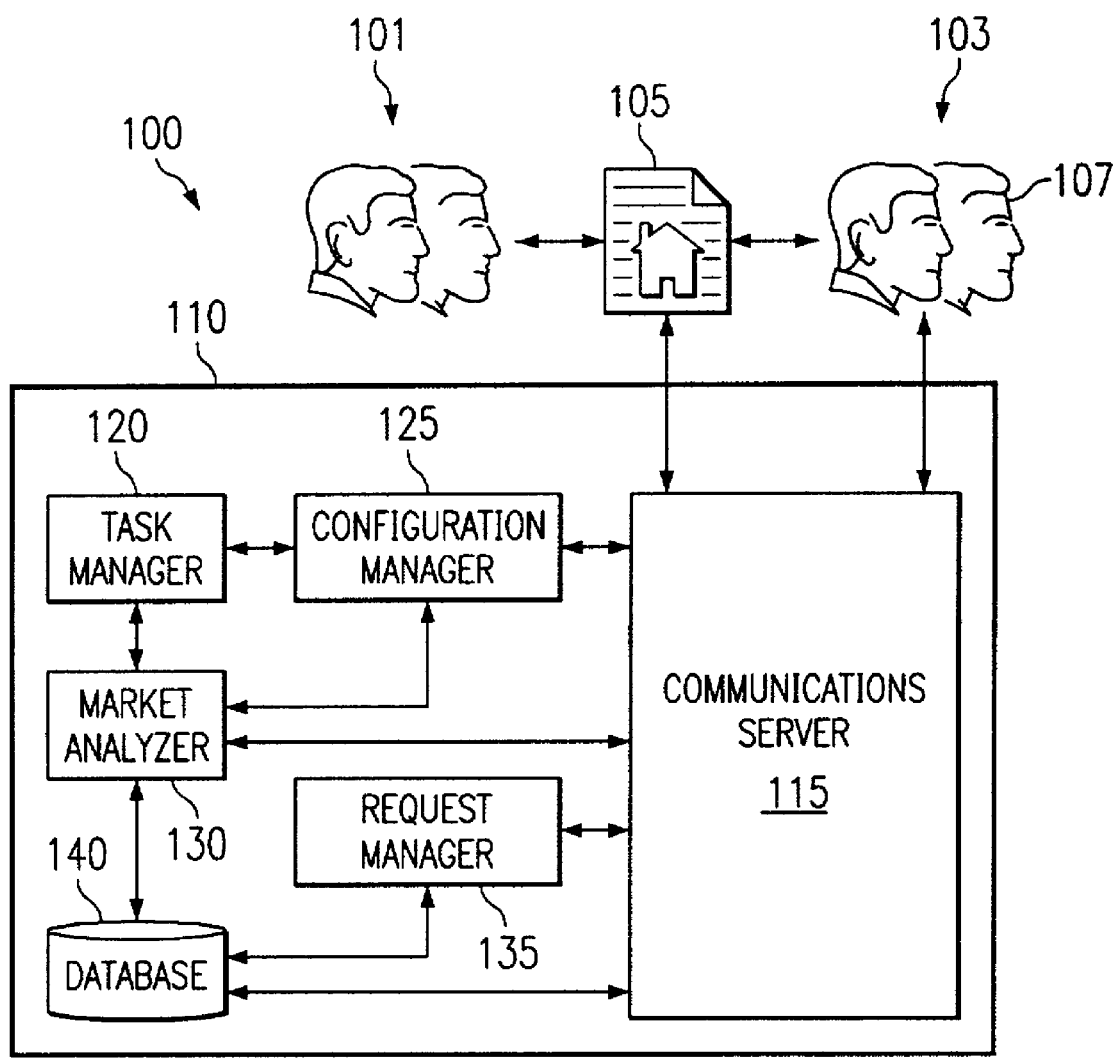
FIG. 1 is a diagrammatic representation of one embodiment of a system for analyzing market transactions at an electronic exchange according to the present invention.

FIG. 1 is a diagrammatic representation of one embodiment of a system 100 for analyzing market transactions at an electronic exchange according to the present invention. In system 100, potential purchasers 101 can procure products or services from a group of possibly competing suppliers 103 at electronic exchange 105 that is part of, or in communication with, market analysis system 110. In one embodiment of the present invention, electronic exchange 105 can be a web site that facilitates market transaction, such as a retail web site or an auction web site. At electronic exchange 105, many potential transactions could be conducted. For example a potential purchaser might directly purchase a product at a quoted price, the potential purchaser might make a bid for a product, or the potential purchaser could request that suppliers offer price quotes on a product (e.g., make a request for quotes or "RFQ"). It should be understood that these are exemplary transactions, and any other market transaction could be carried out at electronic exchange 105. Additionally, it should be further understood that while the electronic exchange is described as being a web site, the present invention can analyze transactions at any number of different electronic exchanges.

Market analysis system 110 can receive transaction data (e.g., information regarding the transactions that occur at electronic exchange 105) and apply various statistical analyses to the transaction data in order to derive results pertinent to the market and to potentially make additional analyses (e.g., revenue management). For example, market analysis system 110 might derive the demand function for a product, price values for a product, etc. Market analysis system 110 could then communicate the results of the statistical analyses to a requesting supplier (e.g., supplier 107). Some examples of the various statistical analyses that could be applied by market analysis system 110 are discussed in detail in conjunction with FIG. 2.

Market analysis system 110 can include software programming stored on a tangible storage medium, which, in one embodiment of the present invention, can be located on a secure server in communication with electronic exchange 105. It should be understood, however, that market analysis system 110 can be located on any computer capable of receiving data regarding transactions from electronic exchange 105 and can, in fact, be distributed over several computers. Market analysis system 110 can include communications server 115, task manager 120, configuration manager 125, market analyzer 130, request manager 135, and database 140. The arrows in FIG. 1 indicate the electronic communication capabilities between these various parts of market analysis system 110. In one embodiment of the present invention, communications server 115 can facilitate communications between market analysis system 110 and external systems, such as electronic exchange 105 or the computer systems of suppliers. Through communications server 115, transaction data (e.g., data regarding transactions that occurred at electronic exchange 105) can be received from electronic exchange 105, either continuously or in batches, and can be sent to database 140 (either directly or through revenue manager). Because database 140 can be continuously updated with new transaction data, database 140 can contain aggregate transaction data. In addition to receiving transaction data, communications server 115 can receive configuration information, which can be used by configuration manager 125 to define how the data from database 140 is grouped for analysis. Additionally, communications server 115 can receive requests for data from a supplier(s) (e.g., supplier 107). The requests can be forwarded to and be processed by request manager 135. If request manager 135 responds to the request, communications server 115 can return the response to the requesting supplier.

As previously noted, configuration manager 125 can define how the data in database 140 should be analyzed. This can include defining which transaction data should be grouped together for analysis and which statistical models should be applied to any such groups by market analyzer 130. The results of the analysis performed by market analyzer 130 can be written out to database 140. Because the statistical analyses can be performed on transaction data associated with a large number of transactions, the present invention can derive meaningful market level results.

In one embodiment of the present invention, a supplier, such as supplier 107, may wish to receive the results of the statistical analysis applied by market analyzer 130. In such a case, the supplier's request for the results can be received by communications server 115 and then be forwarded to request manager 135. In response to the request, request manager 135 can gather the results from database 140 and return the results to the supplier via communications server 115. In addition to requesting the results of a statistical analysis, a supplier may wish to request a summary of the transaction data. For example, a supplier might request a summary of all the transactions that occurred between certain dates. Request manager 135 could receive the request for the summary of the transaction data, retrieve the transaction data from database 140, summarize the transaction data and forward the summary to the supplier. To protect the identity of parties involved in transactions, request manager 135 can be configured to return only a summary of the requested transactions and not detailed information about the participants in the transactions.

The various tasks performed by market analysis system 110 can be coordinated and scheduled by task manager 120. For example, task manager 120 can prompt market analyzer 130 to carry out a particular statistical analysis or prompt communications server 115 to download a batch transaction data from electronic exchange 105. Task manager 120 can also prompt the execution of tasks according to a predefined schedule (e.g., hourly, daily, weekly, monthly, etc.) or task manager 120 could prompt market analyzer to perform tasks based on ad hoc requests (e.g., in response to a supplier's request for the results of a statistical analysis).

As can be understood from the preceding discussion, embodiments of market analysis system 110 can receive transaction data from electronic exchange 105, group the transaction data and apply statistical analyses to the data. Additionally, market analyses system 110 can forward the results of the statistical analyses and a summary of the transaction data to suppliers. In one embodiment of the present invention, the results of the statistical analyses and the summary can forwarded to the suppliers in a format that is compatible with the suppliers' revenue management software systems. Because the suppliers can receive market level data (e.g., data regarding or derived from groups of market transactions carried out by various suppliers) from market analysis system 110 the suppliers can better understand the market and make more informed selling decisions. Furthermore, the suppliers can easily apply revenue management techniques to the results and data provided by market analysis system 110. By providing market level analysis, market analysis system 110 increases market transparency, facilitates selling decisions and provides data for use by the suppliers' pricing and revenue management software systems. Additionally, by providing data regarding aggregate market transactions, market analysis system 110 allows individual suppliers to compare their own performance versus that of other suppliers participating in electronic exchange 105.

Figure 2:
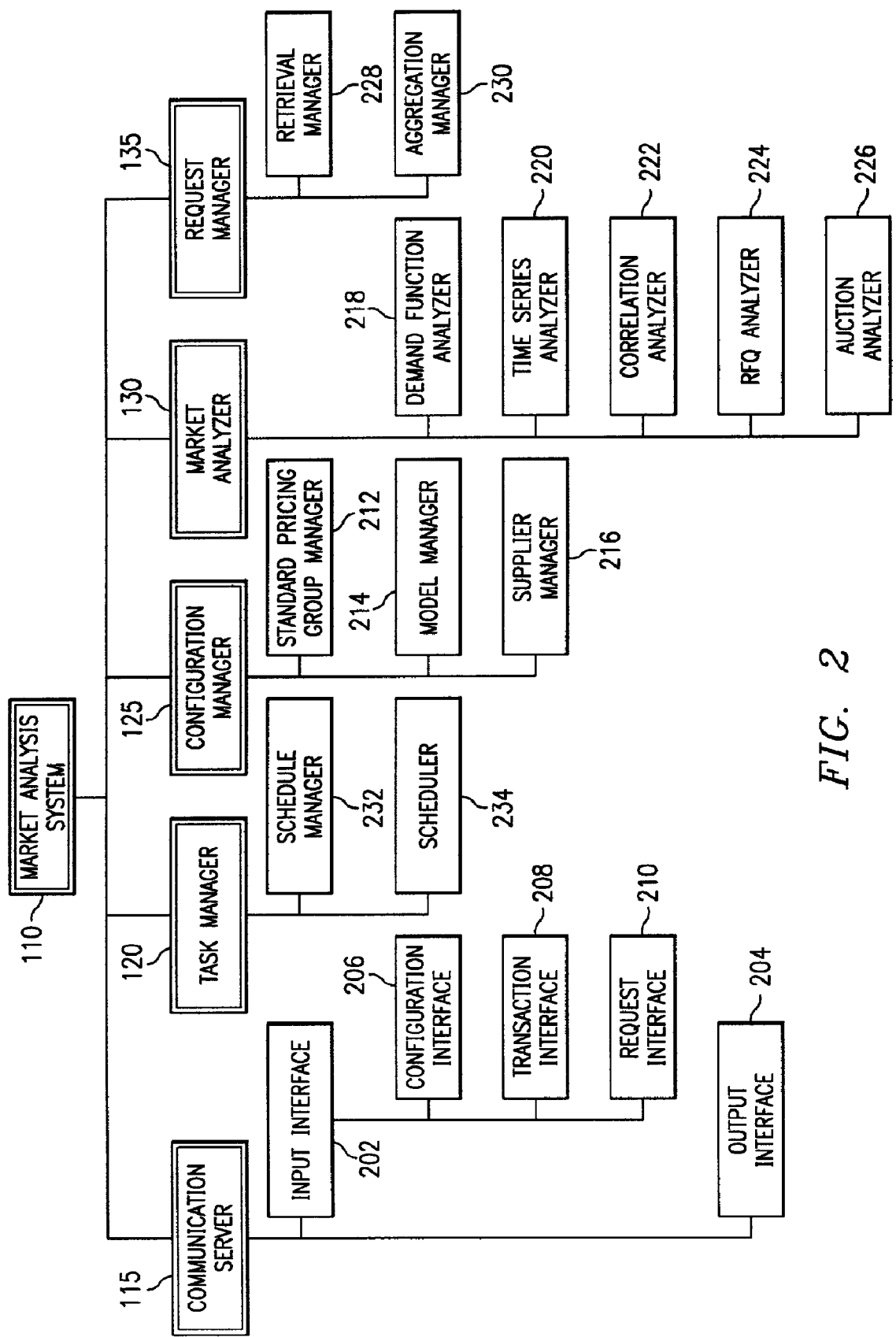
FIG. 2 is a diagrammatic representation of one embodiment of a market analyzer according to the present invention.

FIG. 2 is a diagrammatic representation of another embodiment of a market analysis system 110 according to the present invention. Market analysis system 110 can include a communications sever 115, a task manager 120, configuration manager 125, a market analyzer 130, and a request manager 135. Communications server 115 can facilitate the communication of data between market analysis system 110 and external systems, such as electronic exchange 105 and the computer systems of suppliers. Communications server 115 can include (i) an input interface 202 having a configuration interface 206, a transaction interface 208 and a request interface 210 and (ii) an output interface 204. Configuration information can be received via configuration interface 206 and, as discussed in greater detail below, this configuration information can be used by configuration manager 125 to define how market analyzer 130 acts upon the data in database 140. Additionally, transaction data can be received via transaction interface 208 and requests for information, such as a request for the results of a statistical analysis, can be received via request interface 210. Responses to a request by a supplier can be communicated to a supplier via output interface 204.

After communications server 115 receives transaction data, communications server 115 can store the transaction data in database 140 (not shown in FIG. 2). By storing transaction data in database 140 over a period of time, a database containing aggregate market data can be built. However, because the transactions that occur at electronic exchange 105 may be for unrelated products or services, it may be desirable to further group the data so that meaningful statistical analyses can be performed. For example, an auction web site could offer products from medieval cookbooks to Internet routers, and it is unlikely that analyzing bids from these two categories together would provide meaningful results. In market analysis system 110, configuration manager 125 can be responsible for the configuration of data in database 140 such that similar transactions are analyzed together. Thus, even if disparate products and services are offered over electronic exchange 105, market analysis system 110 can apply statistical analyses to transactions for comparable products or services. The manner in which comparable products or services are grouped can be based upon the configuration information received by communications server 115 via configuration interface 208. In one embodiment of the present invention, the products and services that are considered comparable could be defined externally to market analysis system 110 by, for example, the suppliers that participate in electronic exchange 105.

In one embodiment of the present invention, configuration manager 125 can include standard pricing group manager 212, model manager 214 and supplier manager 216. The standard pricing group manager 212 can define "standard pricing groups" from the data in database 140. Standard pricing groups can be used to define how transactions should be categorized (e.g., which transactions are for comparable products or services). Because the standard pricing groups can be custom-defined, they can encompass a variety of products, services, customer types, time scales, sales channels and so on. As an example, if there is a product or service being offered over the electronic exchange by several suppliers and different delivery terms are offered for the product, a standard pricing group could be defined with reference to the delivery terms. Thus, a product with same day delivery might be in a different standard pricing group than the same product requiring three days to deliver. As another example, all transactions that occur in United States may be defined to be in a different standard pricing group than transactions that occurred in Europe. Standard pricing groups allow market analyzer 130 to apply statistical analyses to a common definition of a product or service.

Along with standard pricing group manager 212, configuration manager 125 can include model manager 214 and a supplier manager 216. Model manager 214 can define the type of statistical analysis that market analyzer 130 will apply to a standard pricing group. For example, if market analyzer 130 can apply four different time series statistical analysis models to a standard pricing group, model manager 214 can determine which time series model should be applied. Additionally, model manager 214 can define starting values and default parameters to be applied during the statistical analysis performed by market analyzer 130. Supplier manager 216 can manage information regarding suppliers that participate in electronic exchange 105 and can facilitate the comparison a particular supplier's transactions with the transactions of other suppliers or with the market as a whole. Furthermore, supplier manager 216 can ensure that the correct information is communicated to the correct supplier. Thus, if a particular supplier requests information regarding how that supplier is performing versus the overall market, supplier manager 216 can ensure that the transactions of the correct supplier are compared to the remainder of the transactions in a standard pricing group and that the comparison is returned to the proper supplier.

Once market transaction information has been properly configured by configuration manager 125 into standard pricing groups, market analyzer 130 can apply various statistical analyses to the standard pricing groups. Market analyzer 130, in one embodiment of the present invention, can include demand function analyzer 218. Demand function analyzer 218 can estimate a demand function, including demand elasticity, for the standard pricing group based on the executed sales transactions (e.g., transactions in the standard pricing group that resulted in the sale of a product or service). In addition to deriving a demand function for a standard pricing group, demand function analyzer 218 can also determine performance measures that calculate the statistical fit of various demand function models. There are currently many well-known statistical techniques that can be applied to derive a demand function such as various economic analyses. Furthermore, demand function analyzer 218 can incorporate new statistical models as they are developed.

Market analyzer 130 can also include time series analyzer 220. As with demand function analyzer 218, time series analyzer 220 also acts on the set of executed sales transactions in a standard pricing group. Time series analyzer 220 can apply time series statistical models to transactions over a period of time to provide information as to how certain averages proceed through time. For example, time series analyzer 220 may give information as to how the average price for a product or service in the standard pricing group fluctuated over time. Additionally, time series analyzer 220 can apply estimate time series models to drive predictions about the further of market behavior. In such a case, time series analyzer might apply an estimated time series model to a standard pricing group to derive a prediction about how the average prices for products in the standard pricing group will behave in the future. An example of a statistical model that might be applied by time series analyzer 218 is the well-known ARIMA model. Additionally, time series analyzer 220 can incorporate other known statistical models or new statistical models as they are developed.

In another embodiment of the present invention, market analyzer 130 can include correlation analyzer 222 to identify time-windowed relationships within a standard pricing group. For example, correlation analyzer 222 might perform a statistical analysis to compare a particular supplier's performance to the performance of the overall market over time, or could compare the prices for a product in the standard pricing group in Europe to the price of the same product in the United States over time. As with demand function analyzer 218, correlation analyzer 222 can act upon executed sales transactions within a standard pricing group. Correlation analyzer can apply regression analysis or other known statistical models, as would be understood by one of ordinary skill in the art. Additionally, correlation analyzer 222 can apply new statistical models as they are developed.

Market analyzer 130 can also include request for quote ("RFQ") analyzer 224. RFQ analyzer 224 can apply statistical analysis algorithms to data regarding unsuccessful sales transactions or quotes by the suppliers to estimate a particular supplier's willingness to sell. For example, if a potential purchaser made a request for a price quote over electronic exchange 105, suppliers might respond with quotes from one dollar ($1.00) to one dollar twenty cents ($1.20) for the product. RFQ analyzer 224 could determine the price spread offered by the various supplies for the product and the quote that was accepted by the purchaser. With the price spread returned by RFQ analyzer 224, a supplier would be able to determine if it was overpricing its products or services. Furthermore, if a purchaser did not choose the lowest quote on a product, the supplier might determine that other factors were important to the customer. Such factors might include, for example, another supplier being located closer to the purchaser, or the other supplier offering different product terms such as extended warranties, etc. In addition to determining the price spread for a product, RFQ analyzer 224 can determine the probability that a supplier will win if they submit a quote at a certain price. As would be understood by those of ordinary skill in the art, RFQ analyzer 224 could apply a regression analysis or other well-known statistical models to derive the probability that a particular quote would win. Additionally, RFQ analyzer can incorporate new statistical models as they are derived.

Market analyzer 130 can also include auction analyzer 226. Auction analyzer 226 can determine the expected price distributions and expected price development curves according to different auction types performed at electronic exchange 105. Auction types can include, among others, English auctions, Dutch auctions, and sealed-bid auctions. Depending on the type of auction, different statistical models could be applied. For example, in the case of an English auction, auction analyzer 226 could determine how bids change over time, derive a distribution for the expected final bid value, and calculate how long it should take to reach the final bid value. Again, as would be understood by those of ordinary skill in the art, auction analyzer 226 can apply a regression analysis, or other known statistical models. Furthermore, auction analyzer 226 can incorporate new statistical models as they are developed.

In addition to performing the statistical analyses described above in conjunction with demand function analyzer 218, time series analyzer 220, correlation analyzer 222, RFQ analyzer 224 and auction analyzer 226, market analyzer 130 can derive various statistical parameters for each analysis. These parameters can include uncertainty parameters, fitted values, comparisons of alternatives and confidence intervals. The specific parameters generated by market analyzer 130 can be dependent or independent of the statistical model applied and are generally well known to those of ordinary skill in the art.

Once market analyzer 110 has analyzed a standard pricing group, the results of the statistical analysis can be stored in database 140. Suppliers who participate in the electronic exchange can then request the results of the statistical analysis. Alternatively, if market analyzer 130 is prompted to perform a statistical analysis by a request from a supplier, market analyzer 130 can communicate the results of the statistical analysis directly to the requesting supplier. A supplier's request for the results of the statistical analysis, in either case, can be processed by request manager 135, which can include retrieval manager 228 and aggregation manager 230. If the set of results is stored in database 140, retrieval manager 228 can identify and retrieve the appropriate set of results from database 140. Retrieval manager 228, in one embodiment of the present invention, can also convert the results into a tabular or graphical format prior to communicating the results to a supplier via communication server 115. Additionally, retrieval manager 228 can format the results in a manner that can be utilized by a supplier's revenue manager software. If a supplier requests a summary of the transaction data instead of the results of a statistical analysis, aggregation manager 230 can retrieve the appropriate transaction data and aggregate it into data sets matching the supplier's request for the summary. In addition to generating reports for suppliers, the present invention can alert users to anomalies in the market. Examples of anomalies can include unexpected prices falls or increases, unforecast changes in volume, changes in elasticity, insufficiency of data to make forecasts, changes in revenue rankings, etc. The tolerances for each of the alerts can, in one embodiment of the present invention, be independently defined by each supplier through the configuration manager. An alert can be treated by request manager 135 as an internally generated request. When an alert is generated, the alerts can then be reported to suppliers via communications server 115.

Market analysis system 110 can also include task manager 120. Task manager 120 can coordinate the execution of different steps carried out by market analyzer 130. Task manager 120 can include a schedule manager 232 and a scheduler 234. Schedule manager 232 can maintain a schedule of calculation tasks (e.g., when market analyzer 130 should perform various statistical analyses) and task sequences that are performed on a regular schedule (e.g., daily, weekly, etc.). Scheduler 234 can then prompt the execution of the tasks defined in schedule manager 232. Thus, for example, if schedule manager 232 contained a schedule of times when transaction data should be downloaded from electronic exchange 105, schedule manager 234 could prompt market analysis system 110 to request the transaction data from the electronic exchange at the times indicated by schedule manager 232.

Because the present invention can analyze aggregate transaction data and not just data based on the transactions of a single supplier, the present invention can provide market level data to suppliers. Additionally, the present invention can provide data on the results of various statistical analyses in a format that is compatible with the revenue management systems of suppliers, thereby facilitating the application of revenue management techniques to maximize profits. The statistical analyses performed by the present invention can further aid suppliers by providing characteristic measures of customer demands for products and services and allowing an individual supplier to compare its performance against the market as a whole. By increasing the amount of information that suppliers have about the transactions at an electronic exchange, the present invention increases market transparency, facilitates buying and selling decisions and increases the overall market efficiency of the electronic exchange.

Figure 3A:
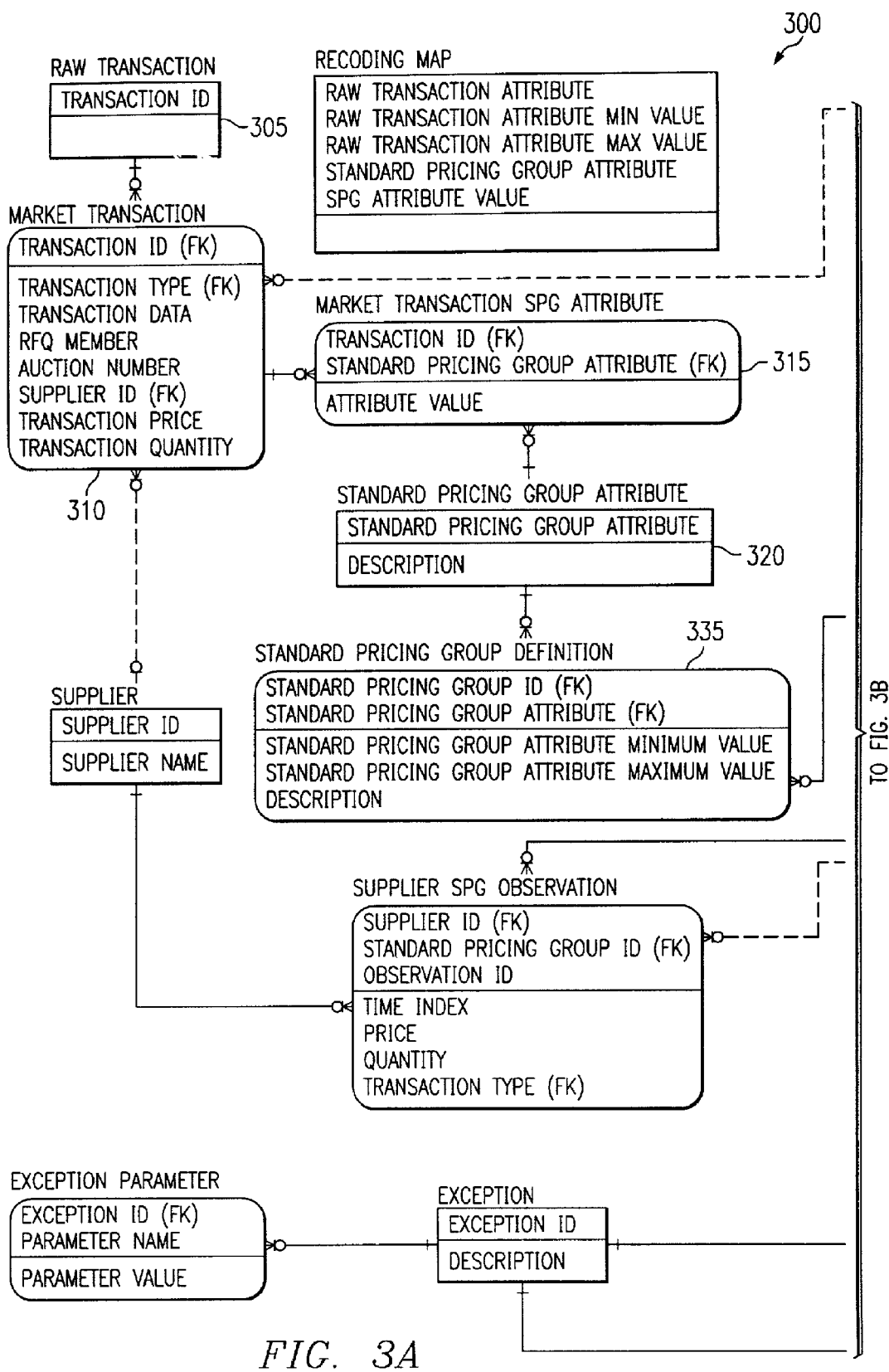
FIGS. 3A-3C show an entity relationship diagram for an embodiment of a system for analyzing transactions at an electronic exchange according to the present invention.
Figure 3B:
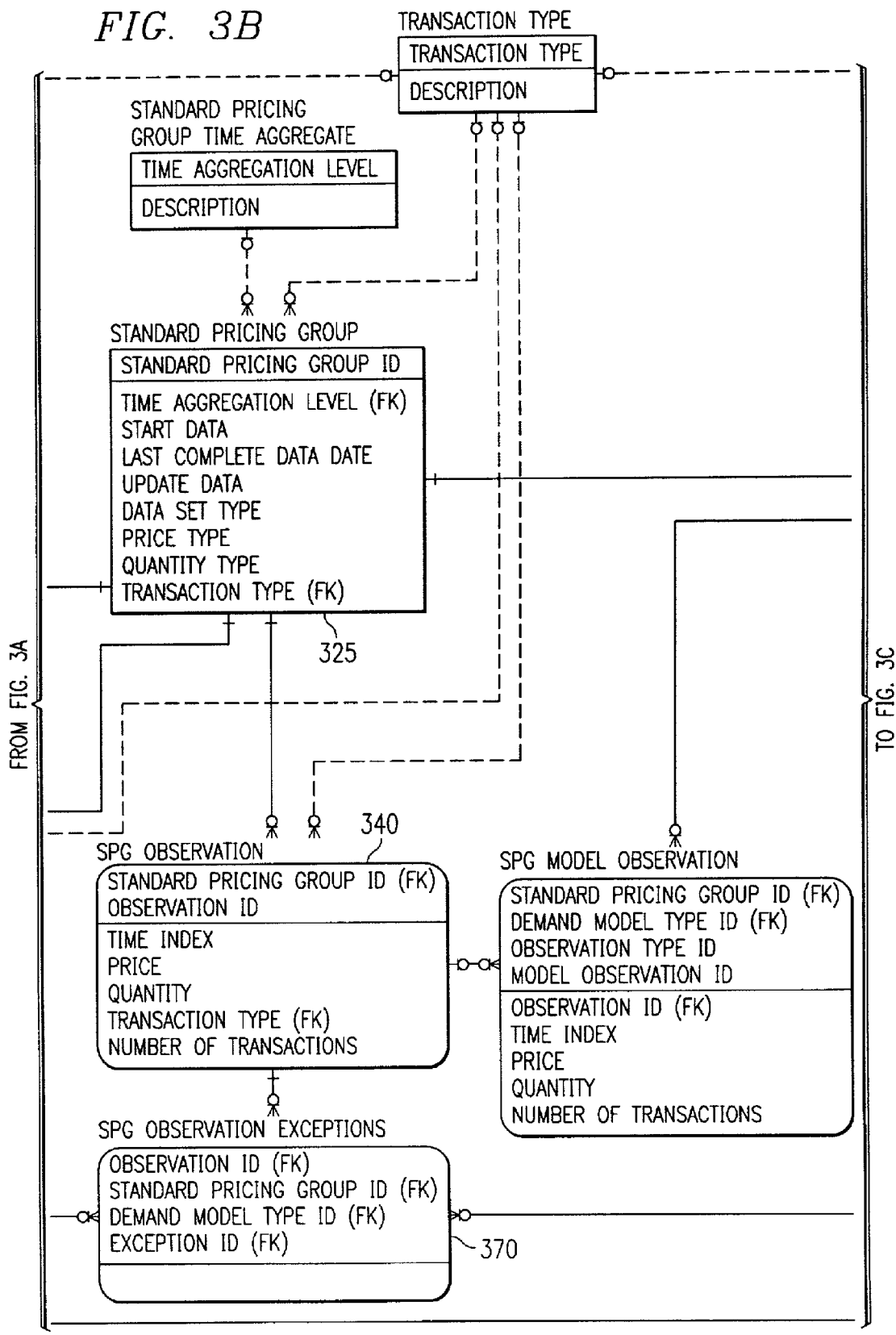
Figure 3C:
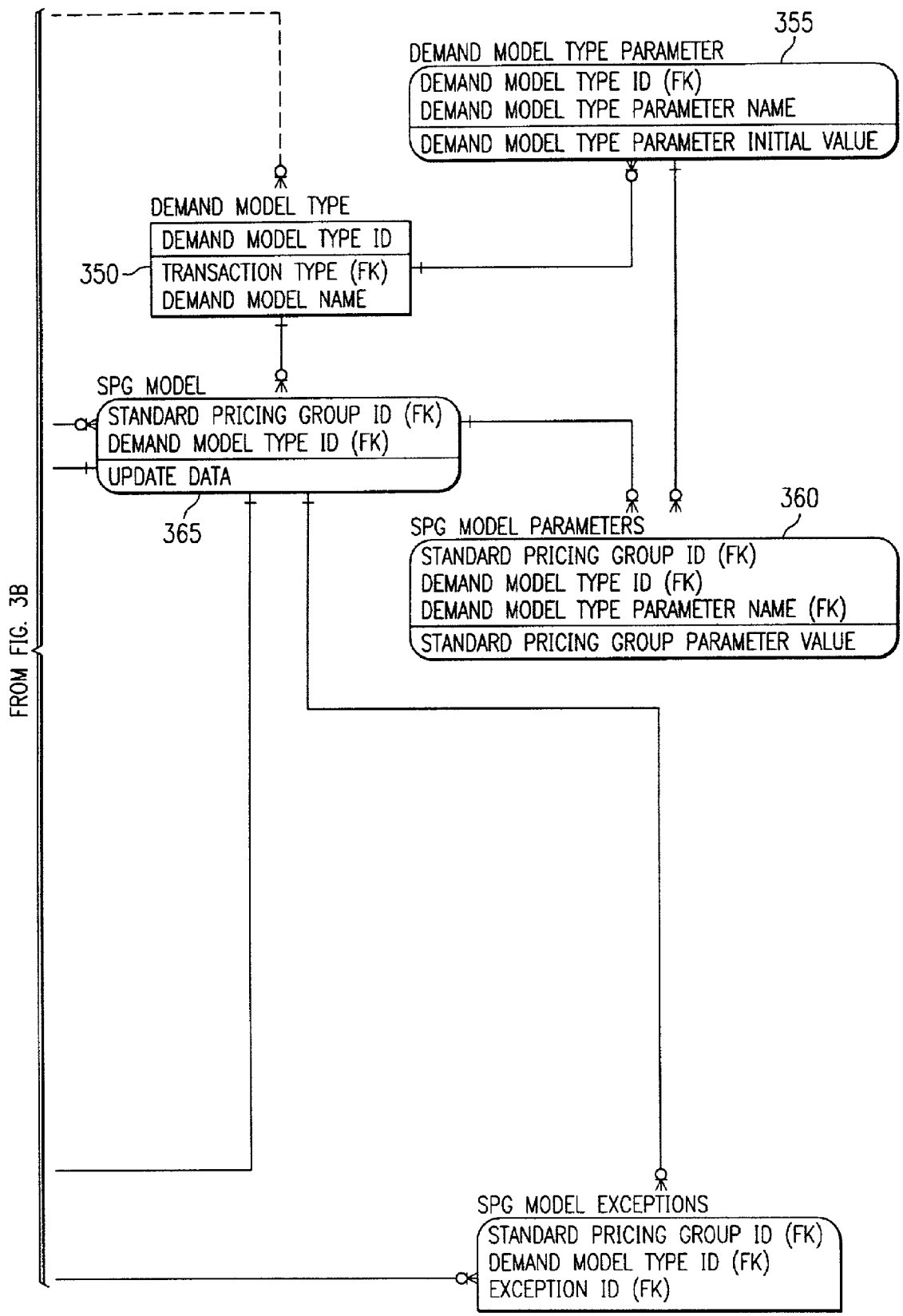

Referring now to FIGS. 3A-3C, one example of an entity relationship diagram 300 is shown for one embodiment of a system 100 for analyzing transactions in an electronic exchange according to the present invention. It should be noted that FIGS. 3A-3C present different portions of the same entity relationship diagram and are related as illustrated in the Figures. Actual transactions that occur at the electronic exchange can be represented by raw transaction entity 305. These transactions can be recorded and placed in a format that is usable by market analysis system 110. The recorded transactions can represented by market transaction entity 310. The market transaction entity 310 can include a transaction type (e.g., whether the transaction was a purchase, a request for a quote or an auction bid) and a transaction date. Additionally, market transaction entity 310 can include an RFQ number if the transaction is a request for quote to identify the transaction from other requests for quotes. Market transaction entity 310 can also include an auction number, supplier identification, the transaction price and a transaction quantity.

As discussed in conjunction with FIG. 2, the transactions can be placed in standard pricing groups by configuration manager 125. The available standard pricing group attributes can be represented by standard pricing group attribute entity 320. For example, if the standard pricing groups were defined by the country in which the transaction took place, then the standard pricing attribute could include a value corresponding to a particular country. Market transaction standard pricing group attribute entity 315 can contain all of the attributes relevant to a particular market transaction for classification of transactions into a standard pricing group. Standard pricing group definition entity 335 can contain, for each standard pricing group, the attribute value range that define the pricing group. Standard pricing group entity 325 can represent the actual standard pricing groups. The standard pricing groups can be further refined into standard pricing group observations as represented by standard pricing group observation entity 340. This might occur if the users wished to apply market analysis to some subset of a standard pricing group. For example, if the user wished to perform a statistical analysis on all transactions that occurred on a particular day in the United States, a standard pricing group observation could be derived with those transactions. The standard pricing group observation entity 340 contains the observations for each standard pricing group. In one embodiment of the present invention, market analyzer 130 can apply statistical analysis to the standard pricing group observations.

As noted earlier, market analysis system 110 can apply various statistical models to market transactions. The statistical models that are available for a particular transaction type are defined in demand model type entity 350. Demand model type parameter entity 355 contains the initial values for each statistical model type. Standard pricing group model entity 345 associates the standard pricing group with a particular statistical model. Standard pricing group model parameter entity 360 contains the current model for each statistical model that will be applied to the standard pricing group. For example, for regression models to be applied, the regression coefficients may be different depending on the standard pricing group to which the aggression model is applied. Thus, each standard pricing group model may have its own parameters. Standard pricing group model entity 365 contains model dependent information. For example, this might include fitted values, forecast values or confidence bands. Standard pricing group observation exceptions entity 370 can contain exceptions that have been associated with a current statistical model. This might include, for example, information about the reliability of a model, outlying data points, or other such information indicating that something is out of the ordinary with the application of a statistical model. Table 1 summarizes the entities included in entity relationship diagram 300.

TABLE 1

| Entity | Description |
|---|---|
| Demand Model Type | Entity that defines the available statistical models for each transaction type. For example, some models are available only for catalog sales while others work on auction transactions. |
| Demand Model Type Parameters | Entity that contains the initial values for each demand model |
| Exception | Entity that defines all the exceptions that are handled by the systems. |
| Exception Parameter | Entity that contains the parameters associated with each exception. For example, if the exception is an unreliable forecast, then a possible exception might be that the coefficient of variation of the demand forecast is larger than 0.5 |
| Market Transaction | Entity for the transactions occurring at the exchange after they have been recoded. |
| Market Transaction SPG Attribute | Entity that contains all the attributes relevant to identify for classification of a market transaction. |
| Raw Transaction | Outside of market analysis system 110: this entity contains Buyer transactions in an as received form to be transformed to Market Transaction for use by the system |
| Recoding Map | Outside of market analysis system: this entity contains transformation values for suppliers product definitions mapping to standard product description for common aggregations and comparisons. |
| Standard Pricing Group "SPG" Model | Entity that associates the data set (i.e., the SPG observations) with the demand models |
| SPG Model Exception | Entity that contains the exceptions that have been associated with the currently estimated model |
| SPG Model Observations | Entity that contains the model dependent data points. For example, model observations are fitted values, forecast values and confidence bands |
| SPG Model Parameters | Entity that contains the current model parameters for each model and dataset |
| SPG Observation | Entity that contains the observations for each standard pricing group. This is the dataset on which the mathematical and statistical models are based |
| SPG Observation Exception | Entity that contains the exceptions that have been associated with each observation based on the current model |
| Standard Pricing Group (SPG) | Entity that identifies a set of observations and their defining attributes |
| Standard Pricing Group Attribute | Entity that contains the available standard pricing group attributes |
| Standard Pricing Group Definition | Entity that contains for each standard pricing group the attribute value ranges that define the pricing group |
| Standard Pricing | Entity that defines the available time aggregation |

TABLE 1-continued

| Entity | Description |
|---|---|
| Group Time Aggregate | values. Possible values are for example "annual", "monthly" and "daily" |
| Supplier | Entity that contains the suppliers for which the system can generate comparisons of supplier performance versus the market |
| Supplier SPG Observation | Entity that contains the observation dataset split by supplier. This facilitates the comparison of the supplier's performance with the market |
| Transaction Type | Entity that defines the supported market analysis system transaction types. Transaction types for example include a catalog purchase, an RFQ request, or an RFQ response. |

Although the present invention has been described in detail, it should be understood that various changes, substitutions and alterations can be made hereto without departing from the spirit and scope of the invention as described in the appended claims.

What is claimed is:

1. A market analysis system comprising:
a computer processor;
a computer readable storage medium;
a database stored on the computer readable storage medium comprising aggregate transaction data; and
a software program stored on the computer readable storage medium executable by the processor to:
receive a set of transaction data from an electronic exchange where market transactions are conducted electronically via the Internet;
store the set of transaction data in the database;
categorize products and services from the aggregate transaction data into a plurality of standard pricing groups according to configuration information received at the market analysis system from one or more suppliers that participate in the electronic exchange, wherein the configuration information includes standard pricing group attributes, wherein the standard pricing group attributes include a value corresponding to a delivery term, a locale, a product, a service, a customer type, a time scale, or a sales channel;
determine at least one statistical analysis to be applied to one of the plurality of standard pricing groups;
define starting values and default parameters of the at least one statistical analysis to be applied to the standard pricing group;
apply the at least one statistical analysis to the standard pricing group to derive a set of results, wherein the set of results include a time-windowed relationship within the standard pricing group; and
communicate the set of results from the at least one statistical analysis to a supplier that participates in the electronic exchange.

2. The market analysis system of claim 1, wherein the at least one statistical analysis comprises at least one of a demand function analysis, a time series analysis, a correlation analysis, a request for quote analysis and an auction analysis.

3. The market analysis system of claim 1, wherein the software program is further executable to store the set of results from the at least one statistical analysis in an aggregate market database.

4. The market analysis system of claim 1, wherein the software program is further executable to communicate the set of results from the at least one statistical analysis in a format compatible with a revenue management software program running on a computer of a supplier that participates in the electronic exchange.

5. The market analysis system of claim 1, wherein the software program is further executable to communicate the set of results from the at least one statistical analysis in response to a user request from a supplier that participates in the electronic exchange.

6. The market analysis system of claim 1, wherein the software program is further executable to return a summary of the set of transaction data.

7. A method for analyzing transactions at an electronic exchange, comprising:
receiving a request for a set of results from a supplier that participates in the electronic exchange;
receiving a set of transaction data from the electronic exchange where market transactions are conducted electronically via the Internet;
storing the set of transaction data in a database;
categorizing products and services in the electronic exchange into a plurality of standard pricing groups in the database according to configuration information, wherein the configuration information includes standard pricing group attributes, wherein the standard pricing group attributes include a value corresponding to a delivery term, a locale, a product, a service, a customer type, a time scale, or a sales channel;
determining at least one statistical analysis to be applied to one of the standard pricing groups in the database;
defining starting values and default parameters of the at least one statistical analysis to be applied to one of the standard pricing groups in the database;
applying at least one statistical analysis to the standard pricing group in the database to derive a set of results, wherein the set of results include a time-windowed relationship within the standard pricing group;
analyzing the set of transaction data stored in the database with respect to the standard pricing groups; and
returning the set of results to the supplier that participates in the electronic exchange.

8. The method of claim 7, wherein the standard pricing group comprises an aggregation of data from the set of transaction data stored in the database.

9. The method of claim 7, further comprising formatting the set of results of the at least one statistical analysis to be compatible with a revenue management software program running on a computer of a supplier that participates in the electronic exchange.

10. The method of claim 7, further comprising communicating a summary of the set of transaction data from the at least one statistical analysis to a supplier that participates in the electronic exchange.

11. The method of claim 7, further comprising applying the analysis to the standard pricing group according to a predefined schedule.

12. The method of claim 7, wherein the at least one statistical analysis comprises at least one of a demand function analysis, a time series analysis, a correlation analysis, a request for quotes analysis and an auction analysis.

13. The method of claim 7, further comprising storing the set of results in from the at least one at least one statistical analysis in an aggregate market database.

14. The method of claim 7, wherein the set of transaction data includes aggregate transaction data.

15. A system for analyzing transactions at an electronic exchange comprising:

a software program stored on a tangible storage medium, executable by a computer processor to:

receive a set of transaction data from an electronic exchange where market transactions are conducted electronically via the Internet;

store the set of transaction data in a database;

categorize products and services from the aggregate transaction data into a plurality of standard pricing groups according to configuration information received at the market analysis system from one or more suppliers that participate in the electronic exchange, wherein the configuration information includes standard pricing group attributes, wherein the standard pricing group attributes include a value corresponding to a delivery term, a locale, a product, a service, a customer type, a time scale, or a sales channel;

determine at least one statistical analysis to be applied to one of the plurality of standard pricing groups;

define starting values and default parameters of the at least one statistical analysis to be applied to the standard pricing group;

categorize at least a portion of the set of transaction data into at least one standard pricing group defined by one or more attributes;

apply at least one statistical analysis to the standard pricing group to derive a set of results, wherein the set of results include a time-windowed relationship within the standard pricing group; and communicate the set of results from the at least one statistical analysis to a supplier that participates in the electronic exchange.

16. The system of claim 15, wherein the statistical analysis comprises at least one of a demand function analysis, a time series analysis, a correlation analysis, a request for quote analysis and an auction analysis.

17. The system of claim 15, wherein the software program is further executable to communicate the set of results from the at least one statistical analysis in a format compatible with a revenue management software program running on a computer of a supplier that participates in the electronic exchange.

18. The system of claim 15, wherein the software program is further executable to apply the at least one statistical analysis according to a predefined schedule.

19. The system of claim 15, wherein the software program is further executable to communicate a summary of the set of transaction data to a supplier that participates in the electronic exchange.

20. The market analysis system of claim 1, wherein the set of results from the at least one statistical analysis comprises an estimate of demand elasticity, an average price, a prediction about future market behavior, a supplier's performance, unsuccessful sales transactions, a supplier's willingness to sell, a probability to win a contract, an expected price distribution, an expected price development curve, or a combination thereof.

21. The method for analyzing transactions at an electronic exchange of claim 7, wherein the set of results from the at least one statistical analysis comprises an estimate of demand elasticity, an average price, a prediction about future market behavior, a supplier's performance, unsuccessful sales transactions, a supplier's willingness to sell, a probability to win a contract, an expected price distribution, an expected price development curve, or a combination thereof.

22. The system for analyzing transactions at an electronic exchange of claim 15, wherein the set of results from the at least one statistical analysis comprises an estimate of demand elasticity, an average price, a prediction about future market behavior, a supplier's performance, unsuccessful sales transactions, a supplier's willingness to sell, a probability to win a contract, an expected price distribution, an expected price development curve, or a combination thereof.

* * * * *